(12) United States Patent
Kang

(10) Patent No.: US 9,354,890 B1
(45) Date of Patent: May 31, 2016

(54) CALL STACK STRUCTURE FOR ENABLING EXECUTION OF CODE OUTSIDE OF A SUBROUTINE AND BETWEEN CALL STACK FRAMES

(75) Inventor: Xinhai Kang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 555 days.

(21) Appl. No.: 12/254,506

(22) Filed: Oct. 20, 2008

Related U.S. Application Data

(60) Provisional application No. 60/981,964, filed on Oct. 23, 2007.

(51) Int. Cl.
G06F 9/40 (2006.01)
G06F 9/38 (2006.01)

(52) U.S. Cl.
CPC ..................... G06F 9/3836 (2013.01)

(58) Field of Classification Search
CPC .............................. G06F 9/3005; G06F 9/3836
USPC ..................... 712/24, 220, 228, 242; 718/108
See application file for complete search history.

(56) References Cited

U.S. PATENT DOCUMENTS

| | | | |
|---|---|---|---|
| 4,754,216 A | 6/1988 | Wong | |
| 4,810,975 A | 3/1989 | Dias | |
| 5,450,360 A | 9/1995 | Sato | |
| 5,535,397 A * | 7/1996 | Durante et al. | 710/267 |
| 5,649,135 A | 7/1997 | Pechanek et al. | |
| 5,724,427 A | 3/1998 | Reeds, III | |
| 5,768,500 A * | 6/1998 | Agrawal et al. | 714/47 |
| 5,778,070 A | 7/1998 | Mattison | |
| 5,933,627 A * | 8/1999 | Parady | 712/228 |
| 5,943,493 A | 8/1999 | Teich et al. | |
| 5,961,577 A | 10/1999 | Soenen et al. | |
| 6,018,759 A * | 1/2000 | Doing et al. | 718/108 |
| 6,151,668 A | 11/2000 | Pechanek et al. | |
| 6,154,544 A | 11/2000 | Farris et al. | |
| 6,446,191 B1 | 9/2002 | Pechanek et al. | |
| 6,480,136 B1 | 11/2002 | Kranz et al. | |
| 6,536,024 B1 | 3/2003 | Hathaway | |
| 6,615,355 B2 | 9/2003 | Mattison | |
| 7,203,821 B2 | 4/2007 | Thimmannagari | |
| 7,249,246 B1 | 7/2007 | Banning et al. | |
| 7,315,956 B2 | 1/2008 | Jensen et al. | |
| 7,334,086 B2 * | 2/2008 | Hass et al. | 711/123 |
| 7,401,223 B2 | 7/2008 | Walmsley | |
| 7,434,053 B2 | 10/2008 | Parry et al. | |
| 7,439,883 B1 | 10/2008 | Moni et al. | |
| 7,598,752 B2 | 10/2009 | Li | |

(Continued)

OTHER PUBLICATIONS

Magnusson, "Understanding stacks and registers in the Sparc architecture(s)", Oct. 20, 2007, 9 pages.*

(Continued)

*Primary Examiner* — David J Huisman

(57) ABSTRACT

In one or more embodiments, system(s), method(s), integrated circuit(s), physical layer(s), apparatus(es), System-on-Chip (SoC), various other hardware, computer-readable and/or executable instructions, and/or technique(s) are described that enable a subroutine to release control of a processing entity when the subroutine is incomplete. By so doing, the processing entity may be used by code outside of the subroutine, such as code that needs attention, and/or more-fully utilize its own processing power by being less idle.

25 Claims, 5 Drawing Sheets

(56) References Cited

U.S. PATENT DOCUMENTS

| | | | |
|---|---|---|---|
| 7,647,473 | B2 | 1/2010 | Kamigaga et al. |
| 7,765,342 | B2 | 7/2010 | Whalley et al. |
| RE41,703 | E | 9/2010 | Pechanek et al. |
| 7,818,542 | B2 | 10/2010 | Shen et al. |
| 8,095,775 | B1 | 1/2012 | Khan |
| 8,116,457 | B2 | 2/2012 | Langton |
| 8,418,006 | B1 | 4/2013 | Trimberger |
| 8,610,454 | B2 | 12/2013 | Plusquellic et al. |
| 8,884,920 | B1 | 11/2014 | Switzer et al. |
| 9,098,694 | B1 | 8/2015 | Moss |
| 2002/0038222 | A1 | 3/2002 | Naka |
| 2002/0161986 | A1 | 10/2002 | Kamigata et al. |
| 2003/0001650 | A1 | 1/2003 | Cao et al. |
| 2003/0061519 | A1 | 3/2003 | Shibata et al. |
| 2003/0065813 | A1 | 4/2003 | Ruehle |
| 2004/0003246 | A1 | 1/2004 | Hopkins et al. |
| 2004/0268075 | A1 | 12/2004 | Qawami et al. |
| 2005/0050542 | A1* | 3/2005 | Davis et al. .................. 718/100 |
| 2007/0046511 | A1 | 3/2007 | Morzano et al. |
| 2007/0136561 | A1 | 6/2007 | Whalley et al. |
| 2007/0262962 | A1 | 11/2007 | XiaoPing et al. |
| 2008/0151670 | A1 | 6/2008 | Kawakubo et al. |
| 2008/0229070 | A1 | 9/2008 | Charra et al. |
| 2008/0232179 | A1 | 9/2008 | Kwak |
| 2009/0019257 | A1 | 1/2009 | Shen et al. |
| 2009/0055637 | A1 | 2/2009 | Holm et al. |
| 2009/0315258 | A1 | 12/2009 | Wallace et al. |
| 2009/0318229 | A1 | 12/2009 | Zielinski et al. |
| 2010/0088484 | A1 | 4/2010 | Roohparvar |
| 2010/0199288 | A1* | 8/2010 | Kalman ........................ 718/108 |
| 2010/0272162 | A1 | 10/2010 | Simeon et al. |
| 2010/0282525 | A1 | 11/2010 | Stewart |
| 2011/0249718 | A1 | 10/2011 | Zerbe |
| 2012/0002803 | A1 | 1/2012 | Adi et al. |
| 2012/0106733 | A1 | 5/2012 | Falch et al. |
| 2013/0021482 | A1 | 1/2013 | Silverbrook |
| 2013/0311792 | A1 | 11/2013 | Ponnathota et al. |

OTHER PUBLICATIONS

Wikipedia, "Calling convention", Oct. 4, 2007, 2 pages.*
Wikipedia, "X86 Disassembly/Functions and Stack Frames", Apr. 23, 2007, 5 pages.*
"Final Office Action", U.S. Appl. No. 12/356,761, (Jun. 3, 2011), 10 pages.
"Non-Final Office Action", U.S. Appl. No. 12/356,761, (Feb. 25, 2011), 8 pages.
Balakrishnan, Saisanthosh et al., "The Impact of Performance Asymmetry in Emerging Multicore Architectures", *In Proceedings of ISCA 2005*, (2005), 12 pages.
Kumar, Rakesh et al., "A Multi-Core Approach to Addressing the Energy-Complexity Problem in Microprocessors", *In Proceedings of WCED 2003*, (Jun. 2003), pp. 1-8.
Kumar, Rakesh et al., "Single-ISA Heterogeneous Multi-Core Architectures: The Potential for Processor Power Reduction", *In Proceedings of MICRO-36 2003*, (2003), 12 pages.
"Non-Final Office Action", U.S. Appl. No. 12/274,235, (Mar. 17, 2011), 11 pages.
"Notice of Allowance", U.S. Appl. No. 12/274,235, (Sep. 16, 2011), 6 pages.
"Non-Final Office Action", U.S. Appl. No. 13/477,664, Dec. 20, 2013, 9 pages.
"Non-Final Office Action", U.S. Appl. No. 12/356,761, Dec. 24, 2013, 11 pages.
Constantinou, et al., "Performance Implications of Single Thread Migration on a Chip Multi-Core", ACM SIGARCH Computer Architecture News, vol. 33 Issue 4, Nov. 2005, 12 pages.
"Advisory Action", U.S. Appl. No. 12/356,761, Aug. 8, 2014, 3 pages.
"Final Office Action", U.S. Appl. No. 12/356,761, May 1, 2014, 6 pages.
"Notice of Allowance", U.S. Appl. No. 13/477,664, Jun. 27, 2014, 6 pages.
"Final Office Action", U.S. Appl. No. 12/356,761, Mar. 4, 2015, 9 pages.
"Final Office Action", U.S. Appl. No. 13/013,274, Feb. 26, 2015, 20 pages.
"Notice of Allowance", U.S. Appl. No. 13/531,244, Mar. 30, 2015, 14 pages.
Clements, "Principles of Computer Hardware", School of Computing, University of Teesside, Fourth Edition, 2006, 38 Pages.
Menezes, "Handbook of Applied Cryptography", CRC Press, Chapters 7 and 10, Oct. 1996, 104 pages.
"Non-Final Office Action", U.S. Appl. No. 13/013,274, Sep. 19, 2014, 20 pages.
"Non-Final Office Action", U.S. Appl. No. 12/356,761, Nov. 18, 2014, 4 pages.
"Restriction Requirement", U.S. Appl. No. 12/356,761, Sep. 4, 2014, 5 pages.
"Coding Laboratory—I2C on an AVR using bit banging", Retrieved from <http://codinglab.blogspot.com/2008/10/i2c-on-avr-using-bit-banging.html> on Sep. 22, 2014, Oct. 14, 2008, 5 pages.
Non-Final Office Action, U.S. Appl. No. 13/013,274, Dec. 24, 2015, 16 pages.

* cited by examiner

CALL STACK STRUCTURE FOR ENABLING EXECUTION OF CODE OUTSIDE OF A SUBROUTINE AND BETWEEN CALL STACK FRAMES

RELATED APPLICATION

This application claims priority to U.S. Provisional Patent Application Ser. No. 60/981,964 filed Oct. 23, 2007, to Xinhai Kang, the disclosure of which is incorporated by reference herein in its entirety.

BACKGROUND

Computing programs are often organized into subroutines. A subroutine is a portion of computing code within a larger computing program that performs a task, usually to further completion or enable functionality of the computing program of which it is a part. Subroutines have many benefits, such as reducing duplication of code in a program, reusing code across numerous programs, and improving a program's readability. In many cases they are also relatively easy for computer programmers to write.

A computing program may call a subroutine, at which point a processor begins to execute the subroutine. The processor often continues to execute the subroutine until the subroutine returns a result. The processor may then move on to other subroutines.

This process of running subroutines can be organized into a call stack. A typical call stack stores information about active subroutines of a computing program so that the computer can know the point at which each active subroutine returns control of the processor when that subroutine finishes executing and returns a result.

Some of these subroutines, however, can be time consuming to complete. In such cases, a processor occupied with that subroutine is unable to work on other subroutines for a long period. This can be unacceptable if the processor is occupied for too long, such when that processor is needed to perform actions or subroutines for other programs that need attention.

Further, in some cases subroutines may prevent a processor from fully utilizing its processing power, such as when a processor is occupied with a subroutine but is partly idle. This can happen when a processor is occupied with a subroutine that cannot complete without help from some other computing entity, such as a hard disk drive providing information used by the subroutine.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In a first computer-readable media embodiment, media is described comprising instructions that are executable to provide a subroutine having a plurality of functions that are executable in a sequence, one after another. At least one function relies on successful completion of a previous function and the previous function is configured such that control of the subroutine is passable back to a call stack without execution of the one function.

In a second computer-readable media embodiment, media is described having computer-executable instructions therein that, when executed by one or more processors, perform acts comprising releasing control of a processing entity to code outside of a subroutine following execution a preliminary function of the subroutine. This subroutine has multiple constituent functions including the preliminary function and a final function. The media then produces a subresult on completion of the preliminary function, the subresult usable by the final function to provide a result that completes the subroutine. The media then releases control of the processing entity to code outside of the subroutine after execution of the final function that completes the subroutine.

In a third computer-readable media embodiment, media is described having computer-executable instructions therein that, when executed, executes a preliminary function of a subroutine having multiple constituent functions including the preliminary function and a final function and produces a subresult on completion of the preliminary function, the subresult usable by the final function to provide a result that completes the subroutine. The media may then release control to first code outside of the subroutine, after which the media executes the final function using the subresult and produces the result that completes the subroutine. The media then releases control to second code outside of the subroutine.

In a method embodiment, a method is described including executing a preliminary function of a subroutine having multiple constituent functions including the preliminary function and a final function and producing a subresult on completion of the preliminary function, the subresult usable by the final function to provide a result that completes the subroutine. After producing the result, the method executes first code outside of the subroutine and then the final function using the subresult. The method may then produce the result that completes the subroutine and execute second code outside of the subroutine.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As noted generally in the Background above, computing programs can utilize subroutines, which in some cases occupy a processor for too long or permit the processor to be idle. This can be a problem in many computing contexts, including ones that have few processing threads or have limited processing resources.

This document describes tools that enable a subroutine to release control of a processing entity when the subroutine is incomplete. By so doing, the processing entity may be used by other subroutines, programs, and the like. In at least this way, the tools enable a processing entity to execute other subroutines that need attention and/or more-fully utilize its own processing power by being less idle.

In some embodiments the tools may permit a subroutine to release control when incomplete by using a structure for the subroutine that is relatively simple for a computing programmer to use. This may take advantage of some of the reasons for using subroutines, such as some of those described in the Background section above, without necessarily requiring the subroutines to be difficult to build or use.

As will be discussed in greater detail below, the tools may be conceptualized as a structural change to call stacks by which programs keep track of subroutines. While the tools are conceptualized in this way for part of the discussion below, such a conceptualization is not intended to limit the tools or their application. The tools may be used and conceptualized in many diverse ways.

In the discussion that follows, an example operating environment is described that may incorporate, represent, or be used by the tools. The tools may include a subroutine, a structure of a subroutine, and/or a processing entity, as well as other elements (e.g., those described in the environment of FIG. 1). Example procedures are also described that may be employed in the example operating environment as well as other environments. These procedures are followed by an example structure of a subroutine and a call stack conceptualizing effects of that structure.

In the discussion below, reference will be made to the environment by way of example only. Therefore, implementation of the tools is not limited to the example environment. The term "tools" as used herein may refer to system(s), method(s), integrated circuit(s), firmware, data structures, apparatus(es), physical layer(s), SoCs, various other hardware, computer-readable and/or executable instructions, and/or technique(s) as permitted by the context above and throughout the document.

Example Operating Environment

Before describing the tools in detail, the following discussion of an example operating environment is provided to assist the reader in understanding some ways in which various aspects of the tools may be, but are not required to be, employed. The environment described below constitutes one example; other environments may be used without departing from the spirit and scope of the claimed subject matter.

Figure 1:
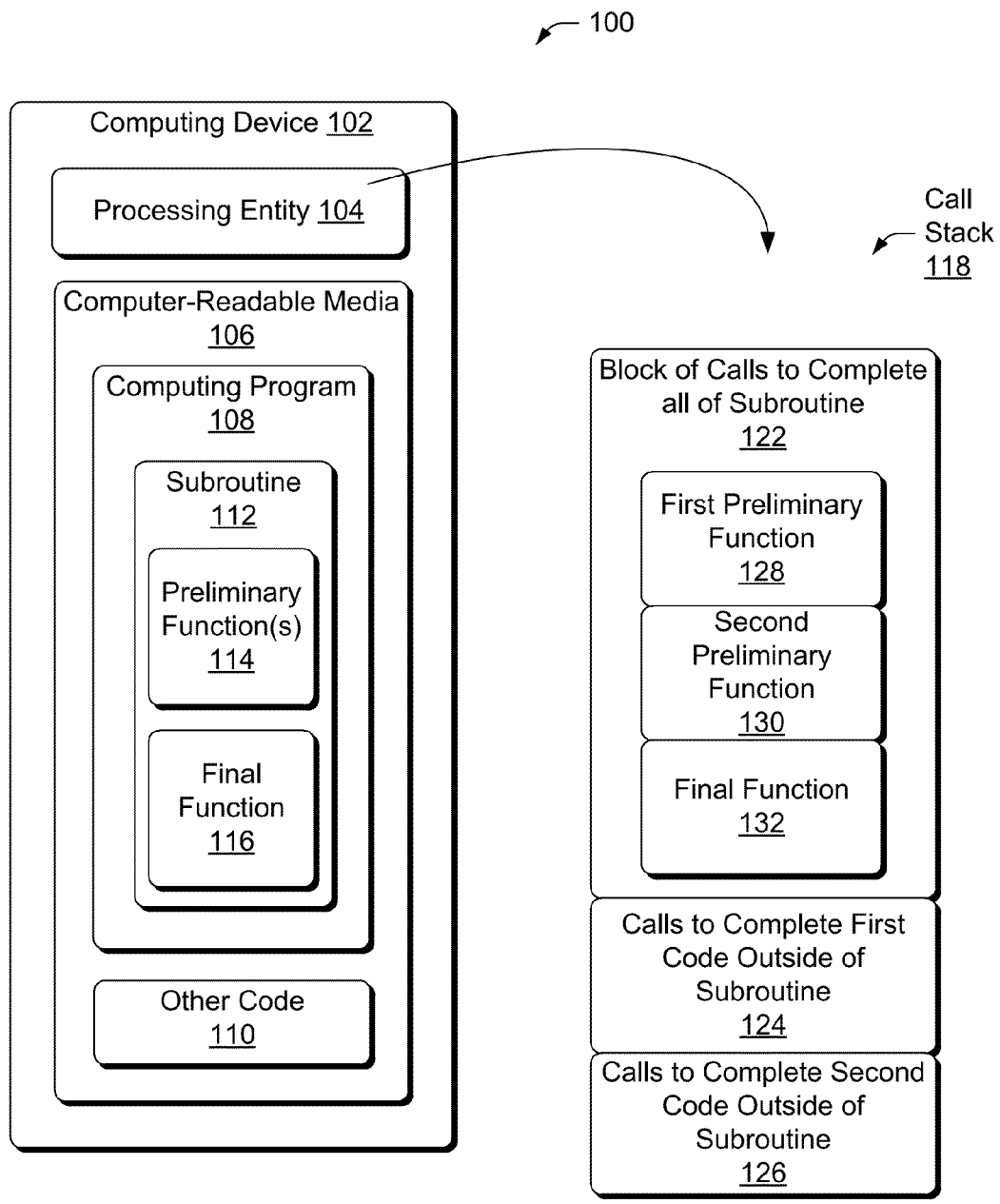
FIG. 1 is an illustration of an example operating environment and an example call stack.

FIG. 1 illustrates one such operating environment generally at 100. The example operating environment includes computing device 102 having a processing entity 104 and computer-readable media 106. The computing device may include one of many types of devices or portions of devices such as a System-on-Chip (SoC). An SoC can be implemented in a fixed or mobile computing device, such as any one or combination of a media device, computer device, television set-top box, video processing and/or rendering device, appliance device, gaming device, electronic device, vehicle, workstation, and/or in any other type of device. The processing entity can be one or more Computer Processing Units (CPUs) capable of executing computer-readable instructions, such as those included within computer-readable media 106.

The computer-readable media includes computer-executable instructions, such as those of computing programs of various types and sizes. Here the computer-readable media is shown including a computing program 108 and other code 110. The other code includes code outside of the subroutine and may be part of the computing program or separate from the computing program. The computing program includes a subroutine 112. The subroutine includes one or more preliminary functions 114 and a final function 116. None, some, or all of the preliminary functions (other than the first preliminary function) may rely on a previous preliminary function and thus act in sequence. In any case, however, at least one of the preliminary functions is relied on by the final function to produce a result that completes the subroutine. For example, a subroutine may include two preliminary functions, a first primary function that produces a first subresult, the first subresult being used by the second preliminary function. The second preliminary function uses this first subresult and then produces a second subresult. The second subresult is then used by the final function to produce a result completing the subroutine. A detailed example of a subroutine having various constituent functions is provided in a section entitled Example Structure of a Subroutine below.

FIG. 1 also illustrates an example call stack 118. This call stack provides a way in which to conceptualize the actions of the processing entity. In cases where all of the subroutine is completed before the subroutine releases control of the processing entity, the processing entity first completes all the subroutine (with block calls, shown at 122) by completing in synchronous order calls for each preliminary function (128 and then 130) and then the final function (132) before moving to execute first code outside of the subroutine (with calls shown at 124). After completing the first code the processing entity moves on, here shown with an example of moving to execute second code outside of the subroutine (with calls shown at 126).

This example call stack shows that the processing entity does not start executing the first code at 124 until all of the subroutine is complete. The subroutine is complete when the execution of the final function returns a result, which here is based on all of the preliminary functions first being executed and returning subresults. The processing entity cannot move on to the other code at 124 until this result is provided. This is but one example illustrating a problem that sometimes exists with executing all of a subroutine before moving to complete some other code outside of the subroutine, such as when that other code is of higher priority or the delay in moving to complete other code can be disadvantageous.

Example Procedures

The following discussion describes techniques, which may be implemented utilizing the previously described environment. Aspects of the procedures may be implemented in hardware, firmware, software, or a combination thereof. The procedures are shown as a set of blocks that specify operations performed by one or more entities and are not necessarily limited to the orders shown for performing the operations by the respective blocks.

Figure 2:
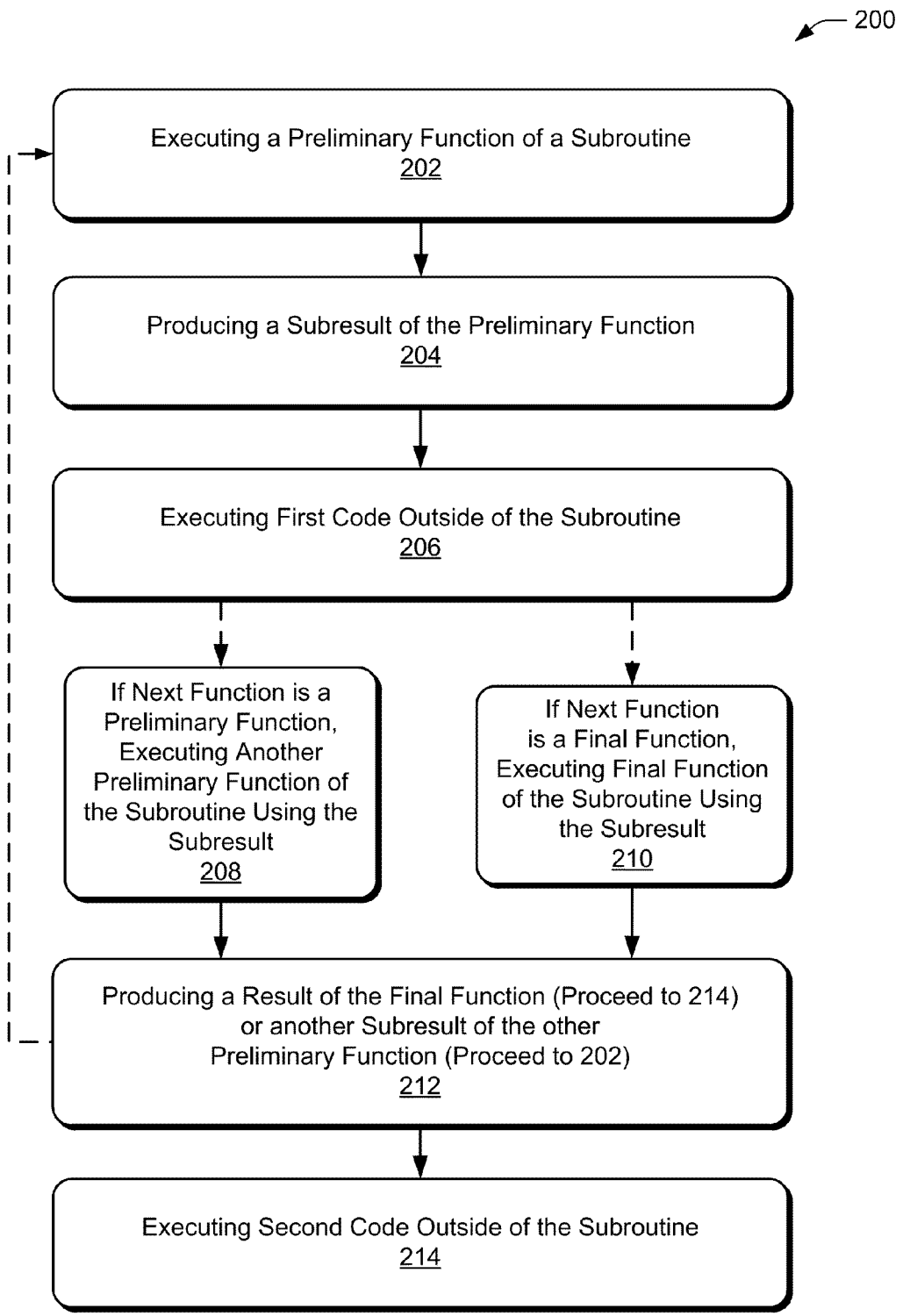
FIG. 2 is a flow diagram that depicts an example procedure in which the tools enable a processing entity to execute code outside of a subroutine when the subroutine has started but before it has ended.

FIG. 2 depicts a procedure 200 in an example implementation in which the tools enable a processing entity to execute code outside of a subroutine when the subroutine has started but before it has ended.

Block 202 executes a preliminary function of a subroutine. As noted above, the subroutine has multiple constituent functions including one or more preliminary functions and a final function. In this example the preliminary function produces a subresult that is used by another preliminary function or by the final function. If used by the final function the result completes the subroutine. There may be any number of preliminary functions acting as intermediaries between the primary function executed at block 202 and the final function.

Block 204 produces a subresult of the preliminary function when the preliminary function completes. By way of example, assume that the preliminary function is a request for an action to be completed by some other computing entity, such as a request of a hard drive to read information and provide that information to the processing entity. Assume also that the preliminary function produces a subresult based on the request, such as the hard drive indicating that it has received the request. In this example the second preliminary function may execute once it has the subresult and the information from the hard drive.

Figure 3:
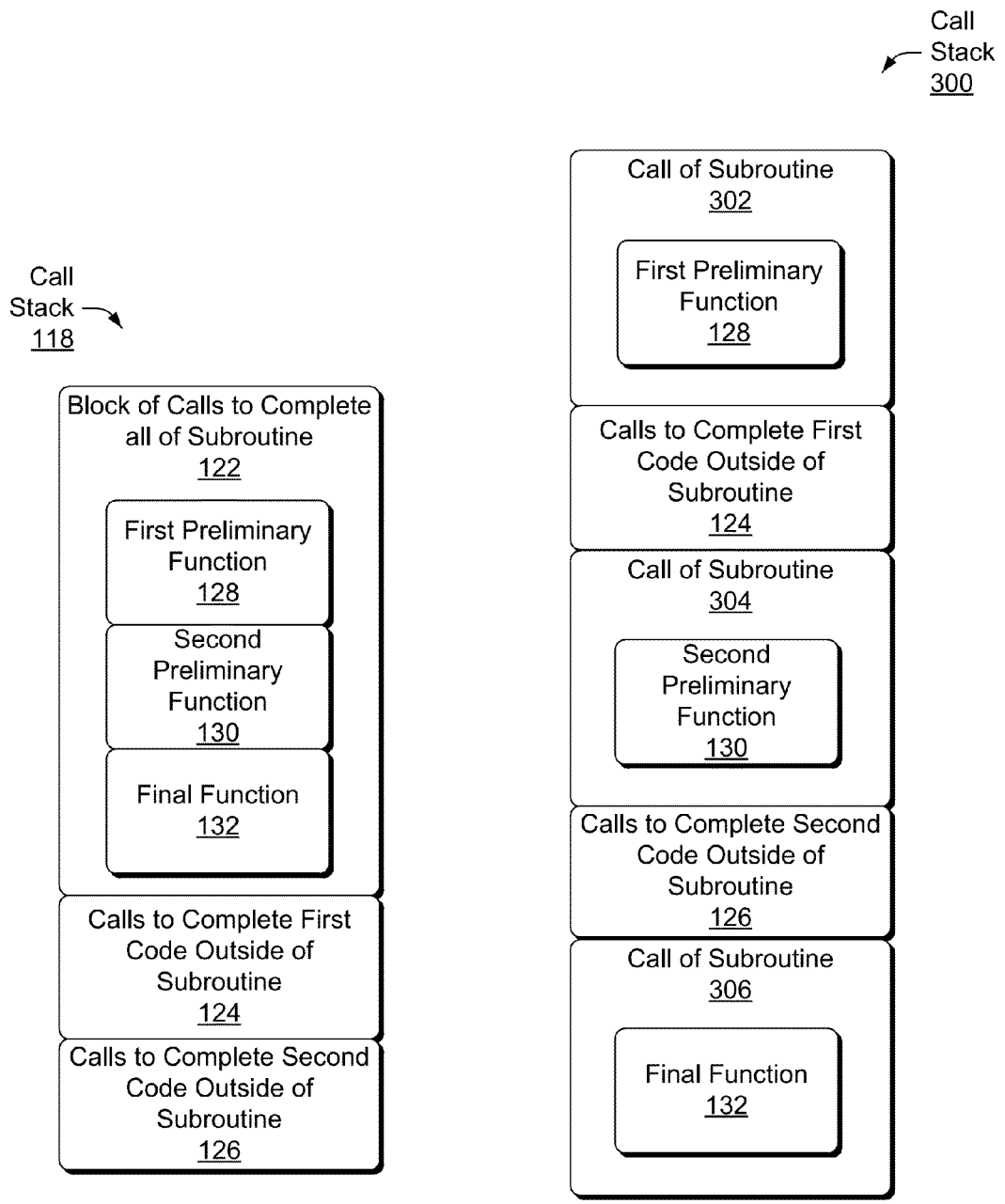
FIG. 3 depicts the call stack of FIG. 1 and a new call stack conceptualizing actions of a processing entity following the flow diagram of FIG. 2.
Figure 4:
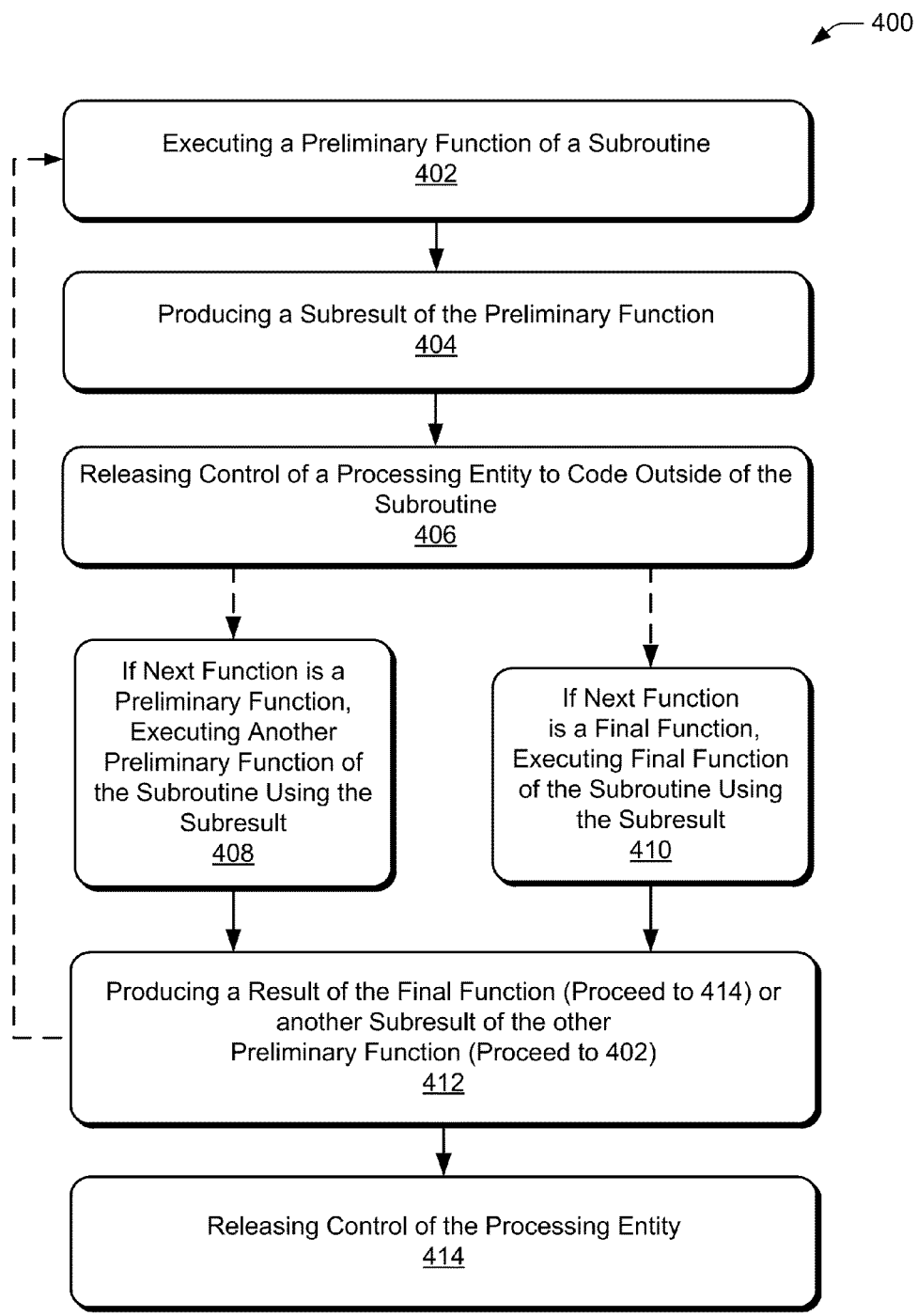
FIG. 4 is a flow diagram that depicts an example procedure in which the tools release control of a processing entity when a subroutine has started but before it has ended.

Consider FIG. 3, which shows the call stack 118 of FIG. 1 along with a new call stack 300. Instead of a block of calls to complete the entire subroutine, the tools complete one or more preliminary function(s) and release control of the processing entity to some other code outside of the subroutine after completing one or more of those preliminary functions. Note how the calls and the process by which the processing entity completes the subroutine and the other code are different—after performing the first primary function at call 302, the processing entity proceeds to complete code outside of the subroutine, here with calls to complete first code outside of the subroutine at 124.

Block 206 executes code outside of the subroutine. Continuing the ongoing example, the other code is performed sooner that it would have been otherwise (this is shown in the call stack 300 at 124).

Following block 206, the tools proceed either to block 208 or 210. In either case the processing entity calls the subroutine and performs the next constituent function. Note that the tools enable the processing entity to do so without having to re-execute previously performed functions. If the next function is a preliminary function, the tools proceed to block 208. If the next function is a final function, the tools proceed to block 210.

Block 208 executes another preliminary function of the subroutine using the subresult produced at block 204. In this ongoing example, a second preliminary function uses a subresult produced at 204 as well as information from the hard drive. If the hard drive takes appreciable time to provide this information, the processing entity would have been idle while it waited for the information from the hard drive. The tools, however, have reduced this idle time of the processing entity by executing code outside of the subroutine at block 206.

If block 208 executes another preliminary function the tools produce another subresult at block 212 and then proceed to perform blocks 202, 204, and 206 again and then either block 208 or 210. The tools may perform these blocks for each additional preliminary function and other, non-subroutine code executed after each constituent function. Returning to FIG. 3, note that a call of the subroutine at 304 executes a second preliminary function 130. After this program function is complete the tools proceed to complete second code outside of the subroutine (at calls 126). Any of the code outside of the subroutine may be code that is part of the computing program of which the subroutine is a part or some other program. This is provided as one example of other types of code that can be executed between constituent functions of a subroutine. Note that in this example the tools enabled use of otherwise idle processing resources (previously noted) and now also enable performance of other, non-subroutine code rather than having that other code wait to be executed.

Block 210 executes the final function of the subroutine using the subresult, such as from the previous preliminary function. Returning to FIG. 3, the tools again call the subroutine here shown at 306 and perform the final function shown at 132. If some other computing entity is involved, such as the hard drive providing information, the tools may execute the final function in some cases without any waiting. The tools may do so without waiting if the information (or result of some other requested action of a computing entity) is immediately available on beginning execution of the final function. This may also be true for other constituent functions in addition to the final function that use information or results from some computing entity.

The results of this process 200, which are visualized at call stack 300, can be the same results as those visualized at call stack 118 in that the subroutine, the first code, and the second code are all completed. One difference, however, is that the processing entity's resources may have been more-fully utilized. Another difference is that completion of other code that would otherwise have waited did not have to wait.

Block 212 produces a result of the final function. This result completes the subroutine. After completing the subroutine, the tools may proceed to execute second code outside of the subroutine at block 214.

As is noted elsewhere herein, the tools may enable the processing entity to perform in this manner using a structure of the subroutine. An example structure is shown after process 400, which is described immediately below.

Blocks 402 and 404 act similarly to blocks 202 and 204 of FIG. 2. At block 406, however, the tools release control of a processing entity to code outside of a subroutine. One example of how the subroutine does this is provided below for a "C" programming example.

At some future point, the processing entity returns to the subroutine to continue executing functions. If there are other preliminary functions the tools proceed to block 408. If there is only a final function, the tools proceed to perform block 410. Blocks 408, 410, and 412 perform similarly to blocks 208, 210, and 212 of process 200, respectively. Block 414 releases control the processing entity after the final function has been performed and the result of the subroutine is provided.

Process 200 and process 400 provide example actions from a perspective of a call stack and from a perspective of a subroutine, respectively. In the example below the tools use or comprise a structure of a subroutine. This structure may enable actions of process 200 and/or process 400.

Example Structure of a Subroutine

Consider, by way of example, a subroutine written in the "C" programming language having three constituent functions, "syncdo_sth_1", "sync_do_sth_2", and "sync_do_sth_3". These functions may be arbitrary. As you can see below, this subroutine performs in synchronized order the "sync_do_sth_1" function, then, once the "sync_do_sth_1" function has a result, the "sync_do_sth_2" function, and once that has a result, the "sync_do_sth_3" function. When the "sync_do_sth_3" function completes, the result of "e" is returned, whereby the subroutine releases control of the processing entity.

```
int sync_do_sth(int a, int b)
{
    int c, d, e;
    ...
    c=sync_do_sth_1(a, b);
    ...
    d=sync_do_sth_2(b, c);
    ...
    e=sync_do_sth_3(e, d);
    ...
    return e;
}
```

As noted above, a typical subroutine retains control of a processing entity until all of the subroutine is complete. The following subroutine, however, releases control of a processing entity when any one of the constituent functions of the subroutine has completed.

```
DECLARE_SST_FUNC(int, async_do_sth, (int a, int b))
{
    LOCAL_DECLARE_BEGIN
        int c, d, e;
    LOCAL_DECLARE_END
    SST_FUNC_START( );
    . . .
    SST_FUNC_CALL(c, async_do_sth_1, (a,b));
    . . .
    SST_FUNC_CALL(d, async_do_sth_2, (b,c));
    . . .
    SST_FUNC_CALL(e, async_do_sth_3, (c,d));
    . . .
    SST_FUNC_RETURN(e);
    SST_FUNC_END( );
}
```

Thus, when the first SST_FUNC_CALL completes, the subroutine releases control of the processing entity. After this release, the processing entity may execute other functions or subroutines separate from this subroutine. If the processing entity would have been idle for part of this function, the processing entity may be more fully utilized by executing other functions or subroutines. Also, if other functions, subroutines, or programs are a priority over waiting for all of this subroutine to complete, then these higher-priority actions are completed rather than all of this subroutine. In either or both cases, using this example structure is often beneficial.

The subroutine may then be called again. In such a case the subroutine does not have to perform the first SST_FUNC_CALL again. Instead, the subroutine moves to the next function. After completing this function, the subroutine may release control again, and so forth. Once all the functions of the subroutine are complete, the SST_FUNC_RETURN returns a result and the subroutine is done. In the above example, 'e' is returned. In this example manner the tools permit other functions, subroutines, and programs to use the processing entity without having the processing entity continuously controlled by the subroutine.

As may be visually apparent, the original and typical subroutine example above looks similar as far as length and without extensive additional complexity to the second subroutine that permits release of a processing entity. As will be appreciated by one skilled in the art, the structural changes shown in the second subroutine would not be appreciably difficult for a computer programmer to implement. This dovetails well into some of the reasons for using subroutines, namely that they can be easy to program and use.

Consider, for example, an example way in which to convert (or use if starting from scratch) from the first subroutine to the second. For defining a subroutine, in the first subroutine it looks like this:

```
int do_something(int a, int b);
```

In the second subroutine it looks instead like this:

```
DEFINE_SST_FUNC_BEGIN(int,do_something)
    int a;
    int b;
DEFINE_SST_FUNC_END(do_something)
```

Continuing this example, consider declaring the first subroutine, which looks like this:

```
int do_something(int a, int b)
{
}
```

Compare this to declaring the second subroutine, which looks instead like this:

```
DECLARE_SST_FUNC(do_something)
{
}
```

Declaring local variables in the first subroutine looks like this:

```
int c;
int d;
```

Compare this with the same for the second subroutine, which looks like this:

```
LOC_DECLARE_BEGIN(do_something)
    int C;
    int d;
LOC_DECLARE_END(do_something)
```

These differences are not difficult for one skilled in the art of writing subroutines to see, yet the effect of this different structure permit at least one of the advantages set forth herein. Consider below ways in which to use the second subroutine. To access local variables, use:

```
SST_LOC(c)
SST_LOC(d)
```

To access parameters, use:

```
SST_P(a)
SST_P(b)
```

Thus, by way of example consider:

```
SST_LOC(c)=SST_P(a)+SST_P(b);
SST_LOC(d)=SST_P(a)*SST_P(b);
```

To call another asynchronized function of a subroutine, the call can look like this:

```
SST_FUNC_CALL(
    caller-name,
    return-value,
    callee-name,
    parameter-init-list);
```

Here the caller-name is the name of the subroutine function that made the call. The return-value is a variable to store a return value when the called subroutine is returned. The callee-name is the name of a subroutine that this subroutine calls. The parameter-init-list is a piece of code to initialize the parameter to the callee.

Using this example structure, a "C" program's "return" is not used, instead a "SST_RETURN" is used.

Figure 5:
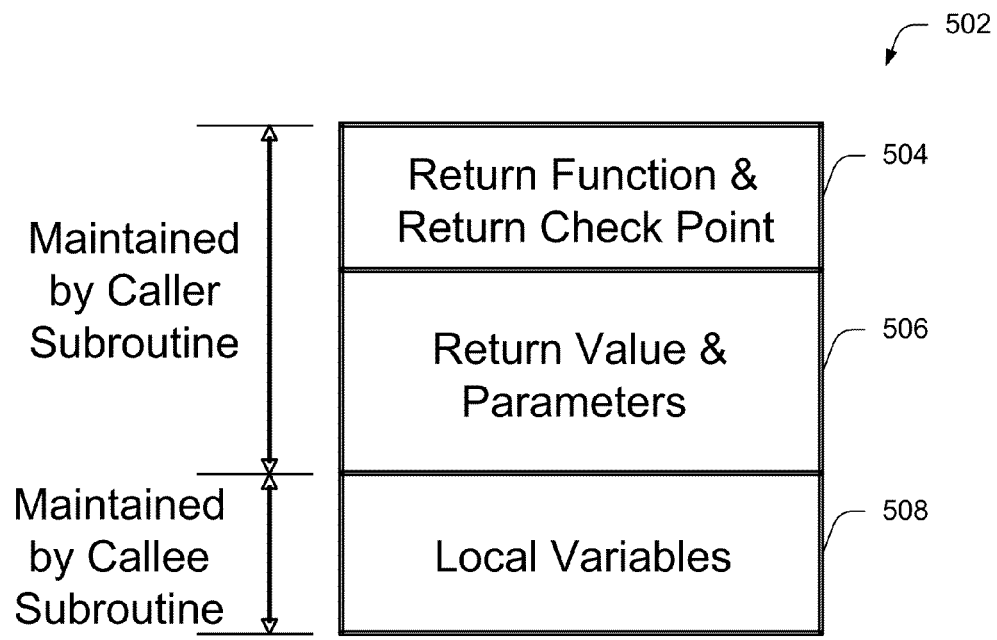
FIG. 5 is an illustration of a structural and/or programming change to a subroutine conceptualized as a call stack.

This structural and/or programming change to a subroutine can be conceptualized as a change to a call stack, such as the example shown in FIG. 5. The second subroutine's call stack has a stack frame 502, having a return subroutine and return check point stack portion shown at 504, a return value and parameters stack portion at 506, and local variables stack portion 508. Note that stack portions 504 and 506 are maintained by a caller subroutine and stack portion 508 is maintained by a callee subroutine.

CONCLUSION

This document describes tools that enable a subroutine to release control of a processing entity when the subroutine is incomplete. By so doing, the processing entity may be used by other subroutines, programs, and the like. In at least this way, the tools enable a processing entity to execute other subroutines that need attention and/or more-fully utilize its own processing power by being less idle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable memory devices comprising instructions that, responsive to execution by a processing entity, provide a subroutine having a plurality of functions that are executable in a sequence, one after another, such that:
   at least one of said functions relies on successful completion of a previous one of said functions;
   the previous one of said functions is configured such that control of the processing entity is passable back to a call stack from which the subroutine was called without execution of the at least one of said functions, thereby enabling execution of code outside of the subroutine; and
   the call stack includes:
      a first call stack frame having a function portion maintained by the at least one of said functions and a subroutine portion maintained by the subroutine;
      a second call stack frame having another function portion maintained by the previous one of said functions and another subroutine portion maintained by the subroutine; and
      at least some of the code outside of the subroutine, the at least some of the code outside of the subroutine located between the first call stack frame and the second call stack frame.

2. The one or more non-transitory memory devices of claim 1, wherein the previous one of said functions comprises a request for an action to be completed by a computing entity other than the processing entity executing the instructions and the at least one of said functions also relies on the action to be completed by the computing entity.

3. The one or more non-transitory memory devices of claim 2, wherein the control of the processing entity is passable back to the first call stack such that the processing entity is enabled to execute the code outside of the subroutine rather than wait for the action to be completed by the computing entity and wherein the code outside of the subroutine is called from the first call stack.

4. A method comprising:
   executing a preliminary function of a subroutine via a call stack frame having a subroutine portion and a preliminary function portion, the subroutine having multiple constituent functions including the preliminary function and a final function, the call stack frame being part of a call stack that includes calls to code outside of the subroutine;
   producing a sub-result on completion of the preliminary function that is maintained by the preliminary function portion of the call stack frame, the sub-result usable by the final function to provide a result that completes the subroutine;
   executing, after completion of the preliminary function and prior to executing the final function, a first portion of the code outside of the subroutine, the first portion of the code outside of the subroutine called from the call stack;
   executing the final function of the subroutine via another call stack frame having another subroutine portion and a final function portion, the final function executed using the sub-result;
   producing the result that completes the subroutine, the result returned via said another subroutine portion of said another call stack frame; and
   executing, after producing the result that completes the subroutine, a second portion of the code outside of the subroutine, the second portion of the code outside of the subroutine called from the call stack.

5. The method of claim 4, wherein the act of executing the first portion of the code outside of the subroutine is responsive to a processing entity that is performing the method being released by the subroutine.

6. The method of claim 4, further comprising, prior to the acts of executing the preliminary function and executing the first portion of the code outside of the subroutine, executing one or more other preliminary functions that are constituent functions of the subroutine, each of the one or more other preliminary functions, when complete, producing one or more other sub-results, each of the one or more other sub-results usable by either the preliminary function or another of the one or more other preliminary functions.

7. The method of claim 6, further comprising executing a third portion of the code outside of the subroutine between the acts of executing each of the one or more other preliminary functions.

8. The method of claim 4, wherein the preliminary function comprises a request for an action to be completed by a computing entity other than a processing entity that is executing the subroutine and the sub-result comprises an indication from the computing entity that does not indicate completion of the action.

9. The method of claim 8, wherein the action, when complete, produces information usable by the final function to produce the result that completes the subroutine.

10. The method of claim 9, wherein the processing entity that is executing the subroutine executes said first portion of the code rather than wait for the information.

11. The method of claim 10, wherein the processing entity, when executing the final function using the sub-result and the information, does not wait for the information because the information is immediately available on beginning the act of executing the final function.

12. The method of claim 4, wherein the act of executing the final function comprises executing the subroutine without re-executing the preliminary function.

13. One or more non-transitory computer-readable memory devices comprising processor-executable instructions that, responsive to execution, perform acts comprising:
   executing, via a processing entity, a preliminary function of a subroutine via a first call stack frame having a subroutine portion and a preliminary function portion, the subroutine having multiple constituent functions including the preliminary function and a final function, the first call stack frame being part of a call stack that includes calls to code outside of the subroutine;
   producing a sub-result on completion of the preliminary function that is maintained by the preliminary function portion of the first call stack frame, the sub-result usable by the final function to provide a result that completes the subroutine;
   releasing, after completion of the preliminary function, control of the processing entity to a first portion of the code outside of the subroutine, the first portion of the code initiated by a first call outside of the subroutine and within the call stack;
   executing, via the processing entity and after completion of the first code outside of the subroutine, the final function via a second call stack frame having another subroutine portion and a final function portion, the final function executed using the sub-result;

producing the result that completes the subroutine, the result returned via said another subroutine portion of the second call stack frame; and releasing, after completion of the subroutine, control of the processing entity to a second portion of the code outside of the subroutine, the second portion of the code initiated by a second call outside of the subroutine and within the call stack.

14. The one or more non-transitory memory devices of claim 13 comprising additional processor-executable instructions that, responsive to execution, perform acts that comprise, prior to the acts of executing the preliminary function and the first code outside of the subroutine, executing, via the processing entity, another one of the multiple constituent functions of the subroutine, said another one of the multiple constituent functions, when complete, producing other sub-results, said other sub-results usable by the preliminary function.

15. The one or more non-transitory memory devices of claim 14 comprising additional processor-executable instructions that, responsive to execution, perform acts that comprise releasing control of the processing entity to a third portion of the code outside of the subroutine between the acts of executing the preliminary function and said another one of the multiple constituent functions.

16. The one or more non-transitory memory devices of claim 13, wherein local variables of the subroutine are maintained by the preliminary function portion of the first call stack frame or the final function portion of the second call stack frame.

17. The one or more non-transitory memory devices of claim 13, wherein a return function or return value of the subroutine is maintained by the subroutine portion of the first call stack frame or said another subroutine portion of the second call stack frame.

18. The one or more non-transitory memory devices of claim 13, wherein the result of the subroutine is returned indirectly by calling a return function that specifies a name of the subroutine or a return value of the subroutine.

19. The one or more non-transitory memory devices of claim 13, wherein the preliminary function of the subroutine or the final function of the subroutine is another subroutine having other constituent functions that are executable via other respective call stack frames.

20. An apparatus comprising:
one or more processors;
one or more hardware-based memory devices comprising processor-executable instructions that, responsive to execution by the one or more processors, implement an asynchronous call stack to:
execute, via the one or more processors, a preliminary function of a subroutine via a first call stack frame having a subroutine portion and a preliminary function portion, the subroutine having multiple constituent functions including the preliminary function and a final function, the asynchronous call stack including calls to code outside of the subroutine;

provide a sub-result on completion of the preliminary function that is maintained by the preliminary function portion of the first call stack frame, the sub-result usable by the final function of the subroutine to provide a result that completes the subroutine;

release, after completion of the preliminary function, control of the one or more processors to a first portion of the code outside of the subroutine, the first portion of the code initiated by a first call outside of the subroutine and within the asynchronous call stack;

execute, via the one or more processors and after completion of the first code outside of the subroutine, the final function of the subroutine via a second call stack frame having another subroutine portion and a final function portion, the final function executed using the sub-result;

provide the result that completes the subroutine, the result returned via said another subroutine portion of the second call stack frame; and release, after completion of the subroutine, control of the one or more processors to a second portion of the code outside of the subroutine, the second portion of the code initiated by a second call outside of the subroutine and within the asynchronous call stack.

21. The apparatus of claim 20, wherein the asynchronous call stack is further implemented to, prior to the acts of executing the preliminary function and the first code outside of the subroutine, execute, via the one or more processors, another one of the multiple constituent functions of the subroutine, said another one of the multiple constituent functions, when complete, producing other sub-results that are usable by the preliminary function.

22. The apparatus of claim 21, wherein the asynchronous call stack is further implemented to release control of the one or more processors to a third portion of the code outside of the subroutine between the acts of executing the preliminary function and said another one of the multiple constituent functions.

23. The apparatus of claim 20, wherein local variables of the subroutine are maintained by the preliminary function portion of the first call stack frame or the final function portion of the second call stack frame.

24. The apparatus of claim 20, wherein a return function or return value of the subroutine is maintained by the subroutine portion of the first call stack frame or said another subroutine portion of the second call stack frame.

25. The apparatus of claim 20, wherein the asynchronous call stack is further implemented to return the result of the subroutine indirectly by calling a return function that specifies a name of the subroutine or a return value of the subroutine.

* * * * *